May 30, 1933.  H. HOWE  1,912,353
ELECTRIC COOKING APPLIANCE
Filed March 15, 1928   4 Sheets-Sheet 1
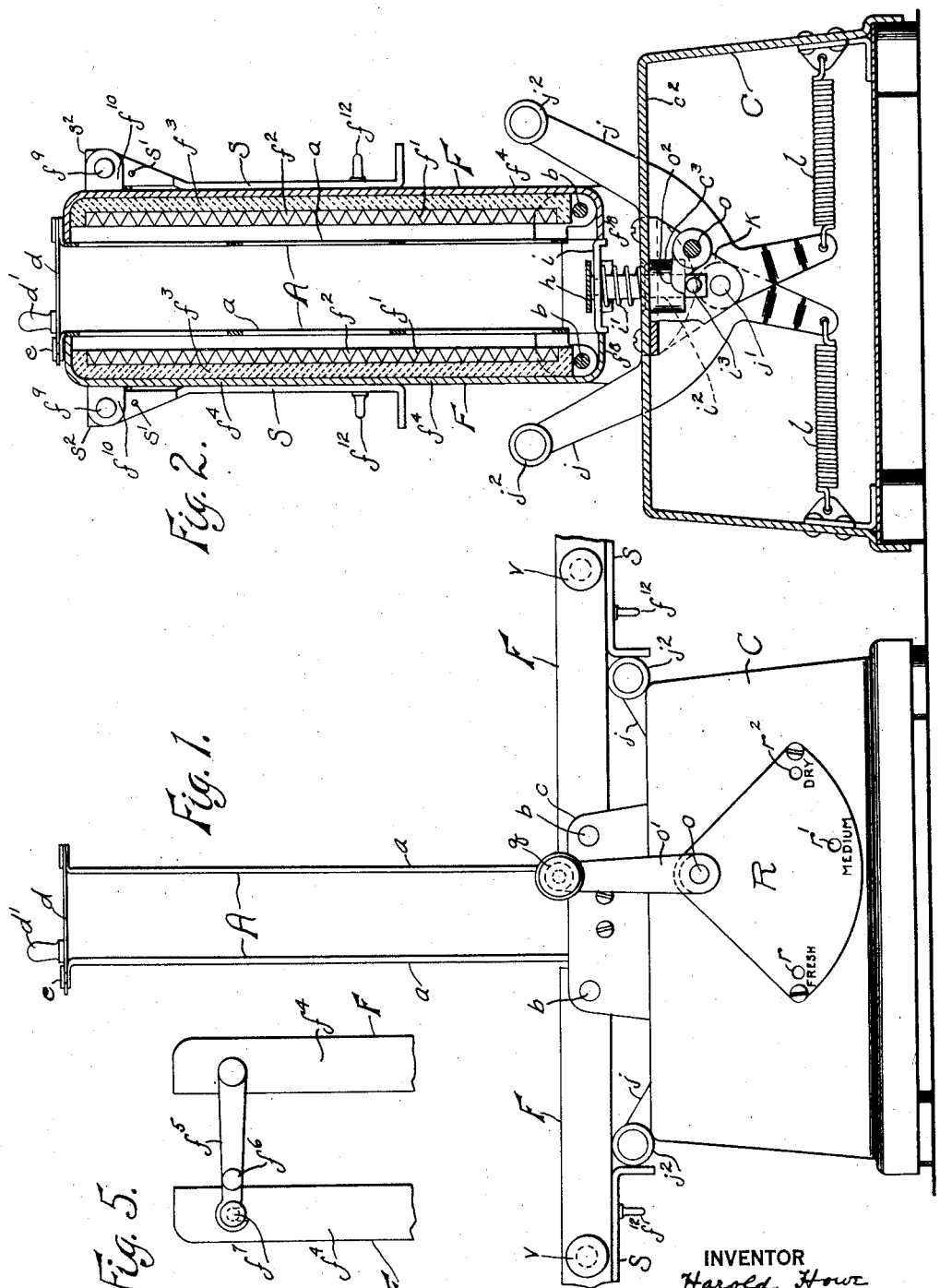
INVENTOR
Harold Howe
BY Henry Lanahan
ATTORNEY May 30, 1933.   H. HOWE   1,912,353
ELECTRIC COOKING APPLIANCE
Filed March 15, 1928   4 Sheets-Sheet 3
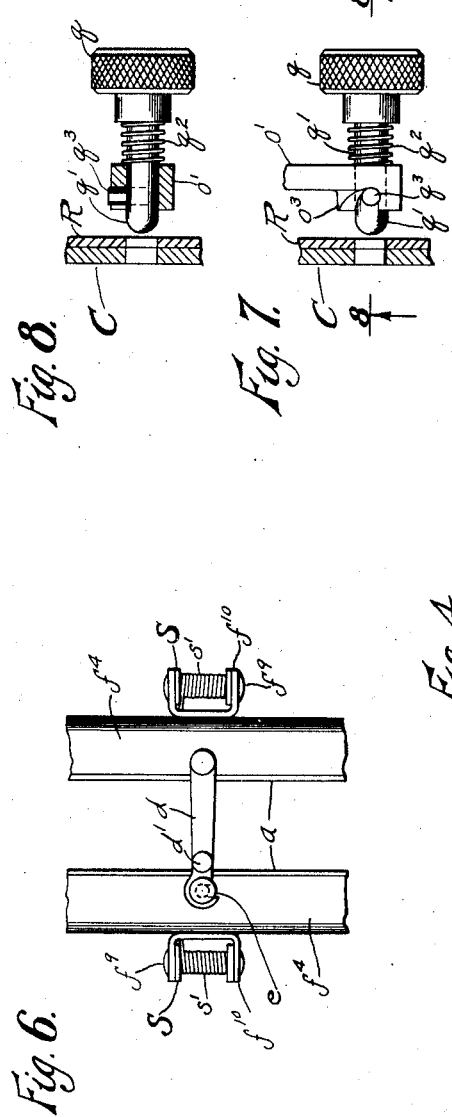
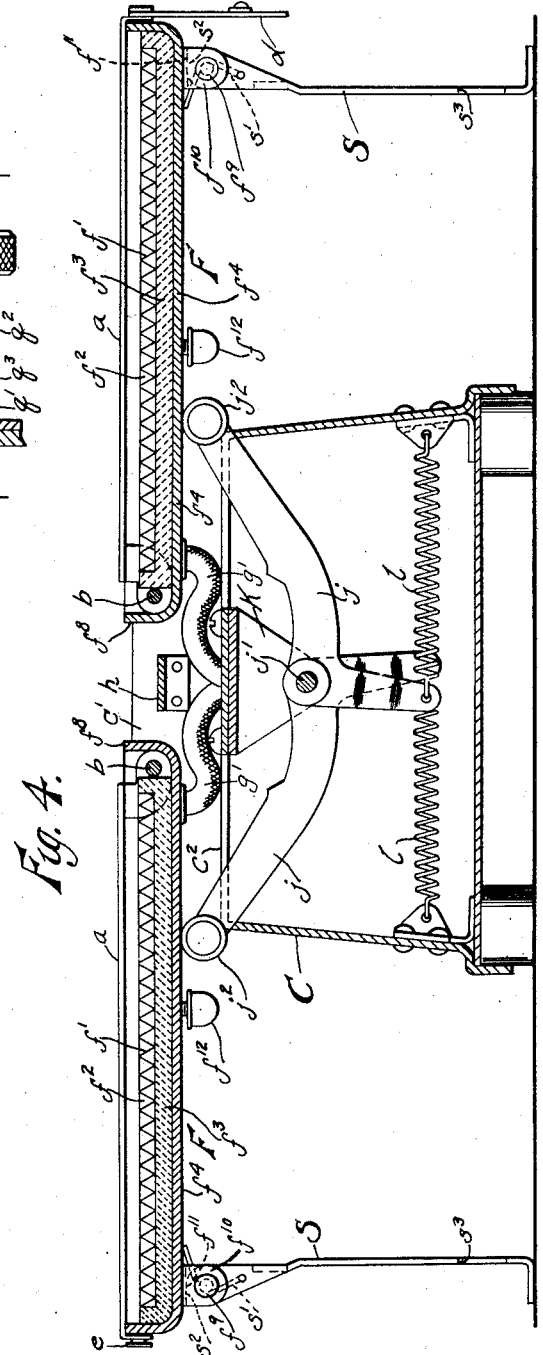
INVENTOR
Harold Howe
BY Henry Lanahan
ATTORNEY

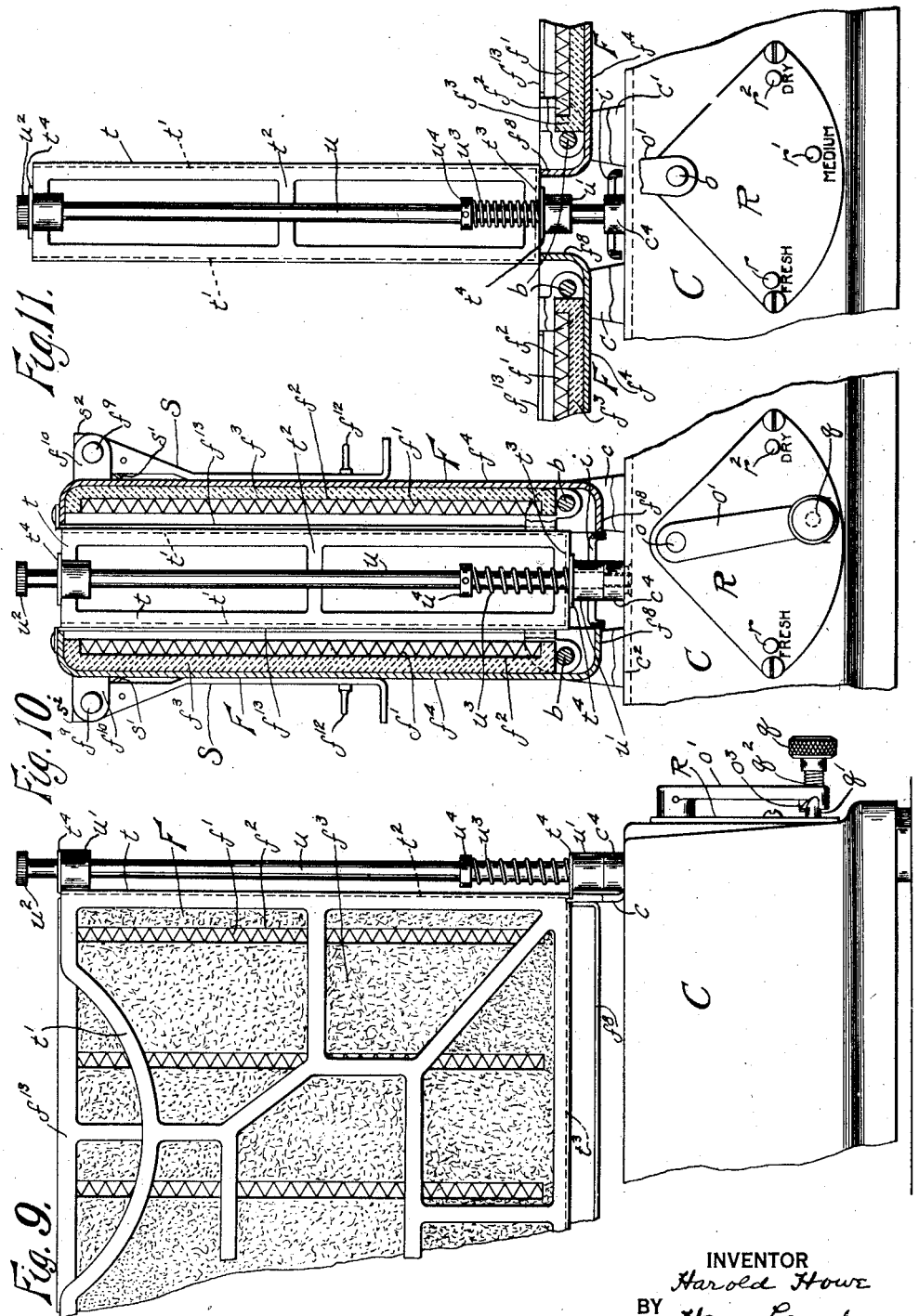

Patented May 30, 1933

1,912,353

UNITED STATES PATENT OFFICE

HAROLD HOWE, OF NEW CANAAN, CONNECTICUT

ELECTRIC COOKING APPLIANCE

Application filed March 15, 1928. Serial No. 261,726.

This application is directed to the same subject matter as my application Serial No. 124,168, filed July 22, 1926 and entitled Electric cooking appliance, which application Serial No. 124,168 has become abandoned.

The invention of this application relates to electric cooking appliances.

One object of the invention is to provide such an appliance which can be used both as an electric toaster for bread and the like and as an electric cooking stove. According to this aspect of the invention the electric heating elements are movable from a toasting position, which is preferably a vertical position, to a cooking positon, which is preferably a position in which the heating elements are disposed in a horizontal plane.

Another object of the invention is the provision of an electric toasting device wherein the bread upon becoming toasted is no longer subjected to a toasting temperature by the heating elements. To this end the heating elements and the devices for holding the bread are relatively movable, the heating elements being preferably moved away from the bread rack.

The invention also seeks to provide a device of this character wherein the bread, after it is toasted, is still subjected to some heat from the electric heating elements but with the relation of parts so changed as to preclude any scorching or burning of the toast because of too close proximity to the source of heat. The heating elements are therefore moved away from the bread rack to a position therebelow, so that heated air rising from the heating elements flows in part in contact with the bread to keep its temperature raised to the desired point. In one embodiment the bread rack itself is raised slightly above its previous position in respect of the heating elements to space the bread from the heating coils to a point where the danger of scorching or burning is removed.

Still another object of the invention is to effect the movements described hereinbefore in an automatic manner when the bread becomes toasted. Accordingly the movement of the heating coils and the bread rack are initiated by operating devices, such as clock mechanism, which may be regulated dependent upon the condition of the bread to be toasted.

The invention also seeks to provide a toaster which can be easily cleaned of crumbs falling from the bread during toasting. This is accomplished by the removable nature of the bread rack and the movable character of the heating elements away from toasting position.

The invention also has for its object the incorporation of the hereinbefore described features in a structure which shall be practicable from the standpoint of manufacture and use. Accordingly the electric heating elements are preferably pivoted upon either side of a vertically disposed bread rack and are adapted to be held in vertical position adjacent the bread rack by devices capable of being released by clock mechanism, the duration of the actuation of which may be regulated as desired dependent upon the condition of the bread to be toasted. When the heating elements are released they fall to a horizontal position under the influence of gravity, their fall being yieldingly cushioned or the impact of their fall being yieldingly resisted by suitable devices, and, if desired, in their movement, the bread rack may be raised to a predetermined point above the heating coils so that the bread is out of scorching relation therewith.

These and other objects of the invention and the means for their attainment will be more apparent from the following detailed description taken in connection with the accompanying drawings illustrating preferred embodiments of the invention and in which:

Figure 1 is a view in end elevation of a cooking appliance according to the present invention showing the heating units away from the vertically disposed bread rack and out of toasting position.

Figure 2 is a transverse vertical sectional view taken in the plane indicated by the line 2—2 in Figure 3, looking in the direction of the arrows, and showing the heating units in toasting position.

Figure 4 is a transverse vertical sectional view of the cooking appliance, also taken in the plane indicated by the line 2—2 in Figure 3, but with the heating units in horizontal position and the bread rack removed so that the appliance may be used as an electric stove.

Figure 5 is a view in end elevation showing fragmentary portions of the heating units and the manually operable latch for securing the said units in vertical position adjacent the bread rack at such times as the device is not in use so that the appliance will then occupy a minimum space.

Figure 6 is a view looking from above showing the manually operable latch illustrated at the top of Figure 1 to secure the sides of the bread rack together, fragmentary portions of the heating units being also illustrated adjacent the sides of the bread rack.

Figure 7 is a detail view showing the locking device incorporated on the timing lever of the clock mechanism whereby that lever may be disposed at a predetermined position preparatory to liberating the clock mechanism.

Figure 8 is another view showing the locking device partly in section in the plane indicated by the line 8—8 in Figure 7, looking in the direction of the arrows.

Figure 9 is a fragmentary view in side elevation similar to the right-hand side of Figure 3 and showing a modification of the invention wherein each of the heating units normally carries a grille to serve as a support for a cooking utensil and the bread rack is removable as a unit from the appliance.

Figure 10 is a view in transverse vertical section of the modification according to Figure 9 showing the heating units in toasting relation with respect to the bread rack.

Figure 11 is a view similar to Figure 10 but showing the heating elements moved away from the bread rack and the bread rack held by the heating elements above the level of the heating coils in a position where bread in the rack will be out of scorching relation to the coils but will still receive some heat therefrom.

Figure 3:
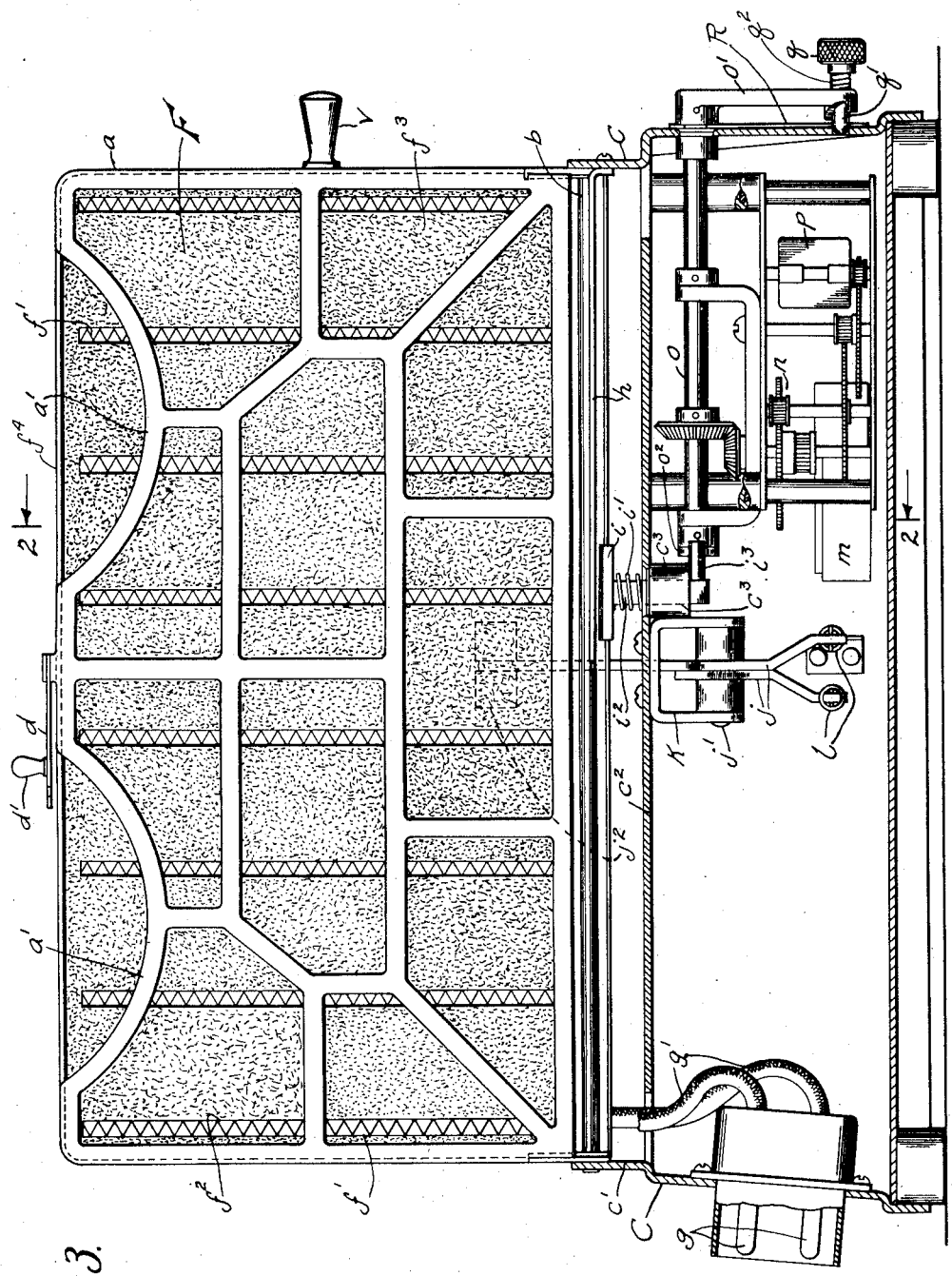
Figure 3 is a sectional view taken in the longitudinal vertical median plane of the electrical cooking appliance showing the heating unit on one side thereof in juxtaposition to the grille forming the bread rack, that is, in toasting position.

When the electrical appliance according to this invention is to be used for the toasting of bread, a slice of bread is placed within a bread rack A formed by two vertically disposed grilles or latticed side frames $a$ which are respectively pivotally mounted upon two longitudinally extending rods $b$ carried in turned up tabs $c$, $c'$ formed on or secured to a base C. These grilles $a$ are secured in vertical position to form the bread rack A by the engagement of a latch or hook $d$ pivoted on one of the grilles at the top and preferably centrally of the ends of the latter, with a pin or button $e$ carried by the other grille. The rack illustrated is of such length as to conveniently hold two slices of bread and the upper edges thereof are indented as at $a'$ to permit convenient grasping of the bread. The hook $d$ may be easily manipulated by the knob or handle $d'$ thereon. To effect a toasting of the bread, heating units F are also respectively pivoted upon the rods $b$ and are adapted to be disposed in vertical position at either side of the bread rack. In the illustrated embodiment the heating units comprise heating coils $f'$ disposed within recesses $f^2$ in a refractory material $f^3$ carried within depressed metallic frames $f^4$ serving not only as supports for the heating units but also intended to present a pleasing appearance when formed of some such metal as brass or nickel, or when silver plated. One of these heating units is also provided with a pivoted latch or hook $f^5$ (Figure 5) which may be easily manipulated by the handle $f^6$ thereon and which is adapted to engage a button $f^7$ on the opposite heating unit. The latch $f^5$ and button $f^7$ are shown as carried on the ends of the units near the top and are for the purpose of securing the units in what may be called closed or compact position, when the appliance is not in use. The heating coils $f'$ are connected in any desired manner with the plug contacts $g$ by wires shown at $g'$, which being slack, permit free pivotal movement of the heating units about the rods $b$.

After the bread has been inserted in the rack A so as to rest upon the toast holder or support $h$, for the purpose of making toast, the heating elements F are moved to vertical positions at either side of said rack to toast both sides of the bread simultaneously. The heating units F are maintained in vertical position by a locking element $i$ which is adapted to be automatically interposed between the inner edges or toes $f^8$ of the respective units F by the spring $i'$. Preferably the locking element $i$ is carried upon the end of a plunger $i^2$ which extends downwardly through the top $c^2$ of the base C, within which it is journaled in the bearing $c^3$, and carries at its lower end a pin $i^3$ to be tripped by a clock mechanism now to be described.

One of the chief features of my invention is the automatic removal of the heating units F from toasting relation with the bread as soon as the toast is made. To this end clock mechanism is employed to trip the latch $i$ and release the heating elements F so as to allow them to fall outwardly and downwardly away from the bread rack A, the impact of their fall being yieldingly resisted by any suitable devices. In the drawings, the impact resisting device is shown as comprising a pair of levers $j$ of irregular outline pivoted, as at $j'$, in the bracket $k$ secured to the top $c^2$ of the base C and carrying at their upper ends the rollers $j^2$ which are adapted to be engaged by the heating units as the latter fall outwardly and downwardly. The levers $j$ are connected at their lower ends to tension springs $l$ secured to the base C, whereby the force exerted by the heating units F in turning the levers $j$ about their pivots $j'$ will be yieldingly resisted.

All bread is not of the same character, that is, some is freshly baked and somewhat moist, some is quite dry, having been baked, say, for several days and, of course, the bread may have varying degrees of dryness in between these two extremes. In order to toast such bread, heat must be applied to the surfaces for periods of varying length depending upon the initial dryness of the bread, that is, heat for a longer period is required to toast fresh bread than is required for bread which is several days old. The present invention, therefore, also contemplates tripping the latch $i$ to release the heating elements F and permit them to fall away from their positions adjacent the bread rack A a predetermined time interval after the toasting operation commences, depending upon the character of the bread. As indicated above the latch $i$ is tripped by clock mechanism, such mechanism comprising a main spring $m$ and a train of gears, indicated at $n$, which rotates a timing shaft $o$ in a counterclockwise direction at a speed determined by a governor $p$. To wind up the main spring a handle or timing lever $o'$ secured to the shaft $o$, is turned in a clockwise direction, and it will be obvious that the greater the angle through which the timing lever $o'$ is turned from the normal vertical position thereof shown in Figure 1 (at which point the latch $i$ is tripped by a lever arm $o^2$, carried at the opposite end of the timing shaft $o$, engaging the pin $i^3$) the longer the time which will elapse before the lever will again have reached the vertical or tripping position as the spring unwinds.

If the spring is wound before the bread is inserted, the timing lever $o'$ may be set at the desired angle and there retained unil it is desired to start the mechanism in operation. The end of the timing lever is provided with a knurled control knob $q$ carried on the end of a plunger $q'$ adapted to enter one of a plurality of holes $r$, $r'$, $r^2$ formed in a setting plate R mounted on the base C. One of these holes, the hole $r$ as shown, is the starting point for the revolution of the timing shaft when fresh bread is to be toasted. It will be observed that the angle through which the timing lever $o'$ turns in a counterclockwise direction is the greatest for fresh bread since a longer time is required for toasting such bread. When dry or medium dry bread is to be toasted the time required for the heated units to be in juxaposition to the bread is less and hence the holes $r'$ and $r^2$, representing the starting points for the rotation of the timing shaft for breads in these conditions, are disposed at lesser angles from the vertical or final position.

The spring $q^2$ on the timing lever normally tends to force the knob $q$ outwardly and withdraw the plunger $q'$ from any of the holes $r$, $r'$ and $r^2$ and retain it withdrawn so that it will not interfere with any obstruction during the rotation of the shaft. To overcome the action of this spring a cam surface $o^3$ is formed on the inner side of the lever $o'$ over which a pin $q^3$ is adapted to ride to retain the plunger $q$ in its advanced position within a hole.

When the appliance is to be used as an electric grille or stove the latches $d$ and $f^5$ are disengaged from the buttons $e$ and $f^7$ and the heating elements F and side frames $a$ of the bread rack are rotated about the rods $b$ to a horizontal position as shown in Figure 4, the frames $a$ then serving as grilles or supports for the receptacles containing the food to be cooked. Obviously toast may then also be made by laying the bread upon the grilles and turning it by hand. The heating units F are then supported in horizontal position by legs S which are pivotally mounted upon pins $f^9$ carried in flanges $f^{10}$ on the casings $f^4$ and which are pressed outwardly to perpendicular position by springs $s'$, a shoulder $s^2$ formed on each leg S being arranged to abut against a shoulder $f^{11}$ on the respective heating element F, thereby to limit the movement of the leg under the influence of the respective spring $s'$. When not in use the legs S are secured adjacent the heating units F by turn buttons $f^{12}$ which are mounted on the latter and which pass through apertures $s^3$ in the legs S.

A modification of the invention is illustrated in Figures 9, 10 and 11. In this form the bread rack $t$ is a unit, consisting of the side grilles $t'$, ends $t^2$ and a bottom $t^3$ on which the toast rests. It is secured to the base C by rods $u$ passing through lips $t^4$ formed on the ends $t^2$ and positioned by collars $u'$ on the rods. These rods are threaded into sockets $c^4$ carried by the top of the base C by turning the rods by their knurled heads $u^2$. The heating elements F are substantially similar to the heating elements described in connection with the previous embodiment with the exception that they carry permanently therewith grilles $f^{13}$ for cooking utensils when the bread rack $t$ is removed.

In this modification when the latch $i$ is tripped and the heating elements fall to horizontal position, as shown in Fig. 11, the bread rack $t$ is raised against the action of springs $u^3$ which are disposed about the rods $u$ between the collar $u^4$ on the latter and the lower lips $t^4$ of the rack, by reason of the engagement of the inner edges or toes $f^8$ of the frames $f^4$ of the heating elements with the bottom $t^3$ of the rack. Thus the toast is automatically raised above the level of the heating units as the latter are moved away so as to avoid all danger of scorching or burning, but at the same time the toast is disposed in a position where it will be kept warm by heated air rising from the coils $f'$. In this connection it is to be noted that the circuit of coils $f'$ is not opened in the movement of the heating elements from vertical position, and therefore the supply of current to the coils continues while the heating elements are in horizontal position. It will also be apparent that in the construction just described the springs $u^3$ will, when the heating elements are released and moved outwardly and downwardly, act to yieldingly resist such movement of such elements and to cushion the impact due to their fall to horizontal position. When the heating units F are again raised to vertical position, as by means of the insulated handles $v$ (Fig. 3), the bread rack is lowered by the action of the springs $u^3$ and at the same time the latch $i$ is raised by the spring $i'$ to engage between the toes $f^8$ of the frames $f^4$ of the heating units (see Fig. 10) to retain the latter in vertical position.

It is thought that the operation of the device is clear from the foregoing description. By the construction described an electrical appliance is provided which is applicable both for toasting bread and for cooking purposes without more than the disengagement of a simple fastening. When used as a toaster, the heating elements are automatically removable from toasting positions, upon the completion of the toasting operation, to positions in which all danger of burning or scorching the toast is obviated while the toast is still subjected to sufficient heat to retain its temperature at a palatable one.

Various modifications may be made in the configuration of the various elements of the appliance as well as in their manner of mounting and/or assembly and in the actuating means therefor, and no limitation is intended by the phraseology of the foregoing description or by the illustration in the accompanying drawings except as indicated in the appended claims.

1. In an appliance of the character described, a vertically disposed rack, a heating device mounted for movement to and from a position adjacent the rack and means actuatable by said device in the movement thereof away from the rack to effect the elevation of the rack, substantially as described.

2. In an appliance of the character described, a vertically disposed rack, a heating device mounted for movement to and from a position adjacent the rack, means actuatable by said device in the movement thereof away from the rack to effect the elevation of the rack, and means tending to hold said rack in a certain lowermost position and acting to return the rack to said position upon movement of the heating device to said position adjacent the rack, substantially as described.

3. In an appliance of the character described, a vertically disposed rack, heating units respectively mounted for movement to and from vertical positions adjacent the rack at either side thereof and means actuatable by said units in the movement thereof from said positions to effect the elevation of said rack, substantially as described.

4. In an appliance of the character described, a vertically disposed rack and an electric heating unit mounted for movement to and from a position adjacent the rack, the circuit supplying current to said unit remaining closed during such movement of the unit, and means actuated by the heating unit in the movement thereof from said position to effect movement of said rack to a position in which food material therein will not be scorched or burned but will still receive heat from said unit, substantially as described.

5. In an appliance of the character described, a base, a holder for bread or other food material mounted on said base for vertical movement relatively thereto, a heating unit pivotally mounted on said base for movement from a vertical position proximate said holder to a position away from the holder, and means whereby the heating unit upon such movement thereof effects vertical movement of said holder, substantially as described.

6. An appliance of the character described, comprising a base, a holder for bread or other food material mounted on said base for vertical movement relatively thereto, a heating unit mounted on said base for movement from a vertical position proximate said holder to a position away from the holder, and means for moving said holder, said means being carried by said heating unit and being actuatable thereby upon said movement thereof to move said holder vertically, substantially as described.

7. An appliance of the character described comprising a base, a holder for bread or other food material carried by the base, heating units respectively pivotally mounted on said base for movement from vertical positions proximate said holder at either side thereof to positions away from the holder and biased to the latter positions, means comprising a device movable to a position wherein it co-acts with said heating units at points below their pivotal mountings when such units are in their vertical positions to thereby lock the same in such positions, automatic means for releasing said locking means after a predetermined time interval, and means for cushioning the impact of said heating units in the movement thereof from the said vertical positions, substantially as described.

8. An appliance of the character described comprising a base, a holder for bread or other food material carried by the base, heating units respectively pivotally mounted on said base for movement from vertical positions proximate said holder at either side thereof to positions away from the holder and gravity-biased to the latter positions, means comprising a single locking member adapted to be positioned to lock both of said heating units in said vertical positions and movable to release the heating units, and automatic means for effecting such releasing movement of said member, substantially as described.

9. In an appliance of the character described, a base, a support for bread or other food material carried by said base, a pair of heating units pivoted on said base for movement from vertical positions proximate and at either side of said support to positions away from the latter, said units being biased to the last mentioned positions, means for locking said units in said vertical positions comprising parts respectively carried by said units and a member movable to a position below the pivotal mountings of said units and between said parts where it engages the latter and thereby maintains the heating units in said vertical positions and also movable to a position in which it disengages said parts to thereby release the heating units, an automatic means for controlling the movement of said member to the latter position, substantially as described.

10. An appliance of the character described comprising a base, a support for bread or other food material carried by the base, grilles pivotally mounted on the base, a device for locking the grilles together in spaced relation at either side of said support, said grilles when so locked together coacting with said support to form a rack, said device being movable to release said grilles to thereby permit movement of the latter to horizontal position, heating units pivotally mounted on said base, a spring-pressed member adapted to coact with said heating units to maintain the latter in vertical positions at either side of said support, timing mechanism, a shaft rotatable by said mechanism, means actuated by said shaft for moving said member to releasing position and manually operable means connected with said shaft for setting said timing mechanism, substantially as described.

11. An appliance of the character described comprising a base, a support for bread or other food material carried by the base, grilles pivotally mounted on the base, a device for locking the grilles together in spaced relation at either side of said support, said grilles when so locked together coacting with said support to form a rack, said device being movable to release said grilles to thereby permit movement of the latter to horizontal position, heating units pivotally mounted on said base, a spring-pressed member adapted to coact with said heating units to maintain the latter in vertical positions at either side of said support, a clock mechanism, a shaft rotatable by said mechanism, a lever connected to said shaft for winding said clock mechanism, said lever and said base being provided with cooperating means for enabling the clock mechanism readily to be wound a predetermined amount, and means for cushioning the impact of the heating units in the movement thereof from said vertical positions.

12. In an appliance of the character described, a rack, a heating device mounted for movement to and from an operative cooking or toasting position adjacent the rack, means actuated by said heating device in the movement thereof from said position to effect movement of said rack to a predetermined changed position, and automatic means for controlling the movement of said device from said position.

13. In a cooking appliance, a movably mounted rack, a heating device mounted for movement to and from an operative cooking position adjacent to the rack, means for moving said rack, said means being actuable by said heating device in the movement thereof from said position to effect movement of said rack to a predetermined changed position, and means arranged yieldingly to resist movement of said rack to said changed position and also yieldingly to resist movement of said device from its said operative position.

This specification signed this 14th day of March 1928.

HAROLD HOWE.